United States Patent [19]
Davenport et al.

[11] Patent Number: 5,408,552
[45] Date of Patent: Apr. 18, 1995

[54] LIGHT VALVES FOR LIGHT GUIDES USING SCATTERING MATERIALS

[75] Inventors: John M. Davenport, Lyndhurst, Ohio; William W. Finch, Ann Arbor, Mich.; Richard L. Hansler, Pepper Pike, Ohio

[73] Assignee: General Electric Company, Schenectady, N.Y.

[21] Appl. No.: 18,852

[22] Filed: Feb. 17, 1993

[51] Int. Cl.⁶ ............................................. G02B 6/26
[52] U.S. Cl. ................................... 385/31; 385/18
[58] Field of Search ................... 385/31, 15, 16, 18, 385/19, 20, 21, 22, 23, 37

[56] References Cited

U.S. PATENT DOCUMENTS

| | | | |
|---|---|---|---|
| 4,274,706 | 6/1981 | Tangonan | 385/37 |
| 4,278,327 | 7/1981 | McMahon et al. | 385/20 |
| 4,422,714 | 12/1983 | Benoit et al. | 385/18 |
| 4,583,820 | 4/1986 | Flamand et al. | 385/37 |
| 4,938,553 | 7/1990 | Maerz et al. | 385/37 |
| 5,226,104 | 7/1993 | Unterleintner et al. | 385/18 |

Primary Examiner—Rodney B. Bovernick
Assistant Examiner—John Ngo
Attorney, Agent, or Firm—George E. Hawranko; Stanley C. Corwin

[57] ABSTRACT

A light valve for regulating light through an optical fiber system includes a scattering panel interposed between first and second light guides. A reflecting surface directs the light from the output end of the first light guide toward the input end of the second light guide, thereby eliminating losses associated with known arrangements. Use of a reflecting surface advantageously provides multiple passes through the scattering panel to increase the contrast ratio between on and off states of the system, if desired.

2 Claims, 3 Drawing Sheets

Fig. 1
(PRIOR ART)
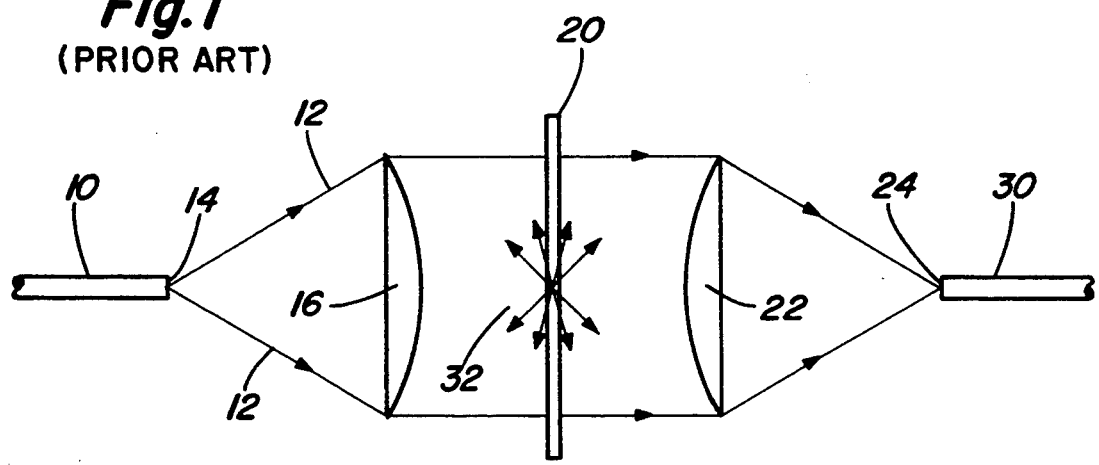
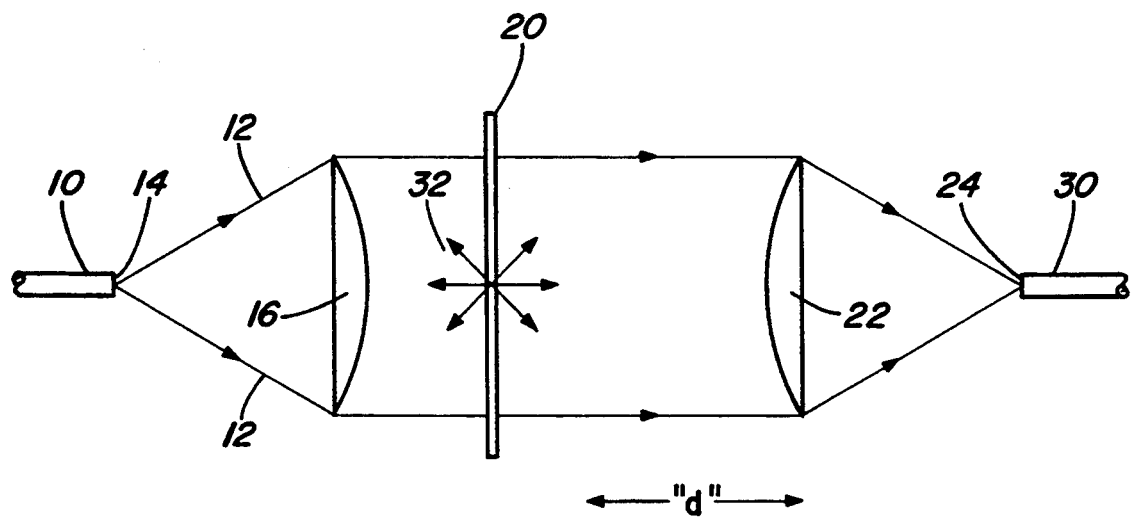
Fig. 2

5,408,552

LIGHT VALVES FOR LIGHT GUIDES USING SCATTERING MATERIALS

BACKGROUND OF THE INVENTION

The present invention relates to transferring light from a light guide to an end use, and more particularly in regulating the transfer of light with low loss.

It is generally known in the art to regulate transfer of light from a first light guide comprised of one or more optical fibers to a desired end use. Typically, an associated, high efficiency light source provides light to an input end of an optical fiber system which, in turn, transmits the light to the desired end use. For selected applications, regulation or interruption of the light flow through the light guide is necessary. For example, the application may require rapid on and off states, or alternatively, the amount of light passing through the light guide requires regulation. Rather than regulating the light at the source, as is typical, it may be more desirable to maintain the light source in an on state and selectively interrupt light flow at a remote location in the optical fiber path.

There are various known methods for switching light on and off in systems using light guides. For example, a mechanical interruption such as a mechanical shutter may be provided at the input end of the light guide. This is often undesirable since design requirements do not always accommodate such a structure adjacent the light source.

According to another arrangement, a liquid crystal display panel (LCD) is disposed between a pair of lenses whereby light exiting the first light guide is collimated, passes through the LCD, and is then focused by the second lens onto the input end of a second light guide. By regulating an electrical field associated with the LCD, electrical dipole axes of the liquid crystal molecules are selectively aligned to provide a dynamic regulation of light transmissibility. This type of arrangement provides an on/off ratio of light transmission on the order of approximately 30:1. One problem associated with this arrangement is the loss associated with scattering as the light proceeds from the output end of the first light guide, through the collimating lens, through the scattering panel, through a focusing lens, and into the input end of the second light guide. Even if careful consideration is given to the various materials, losses result due to scattering. It is thus important to minimize these losses so that an increased ratio between on and off states can be achieved.

One particular use for such an arrangement is in the automobile industry where, for example, an increased emphasis is placed on a central light source and use of a fiber optic system to conduct the light to remote locations for various applications, such as tail lights, interior lighting, display panel, etc. Such a centralized system substantially precludes regulation of light by turning the light source on and off, or regulating the light at the input end of the fiber optic system, i.e., at the light source.

SUMMARY OF THE INVENTION

The present invention contemplates a new, compact and improved light valve apparatus that overcomes losses associated with prior art arrangements while providing a high contrast ratio between on and off states.

According to another advantage of the invention, light transmission is regulated at an area remote from the light source.

Still another advantage of the invention resides in the ability to dynamically control light transmission in an instantaneous and efficient manner.

Still other advantages and benefits of the invention will become apparent to those skilled in the art upon a reading and understanding of the following detailed description.

BRIEF DESCRIPTION OF THE DRAWINGS

For a better understanding of the invention, reference may be made to the following description taken in connection with the accompanying drawings, wherein:

FIG. 1 is a schematic, elevational view of a prior art light valve system;

FIG. 2 is an elevational view of a light valve system according to the subject invention;

DETAILED DESCRIPTION OF THE PREFERRED EMBODIMENTS

Figure 3:
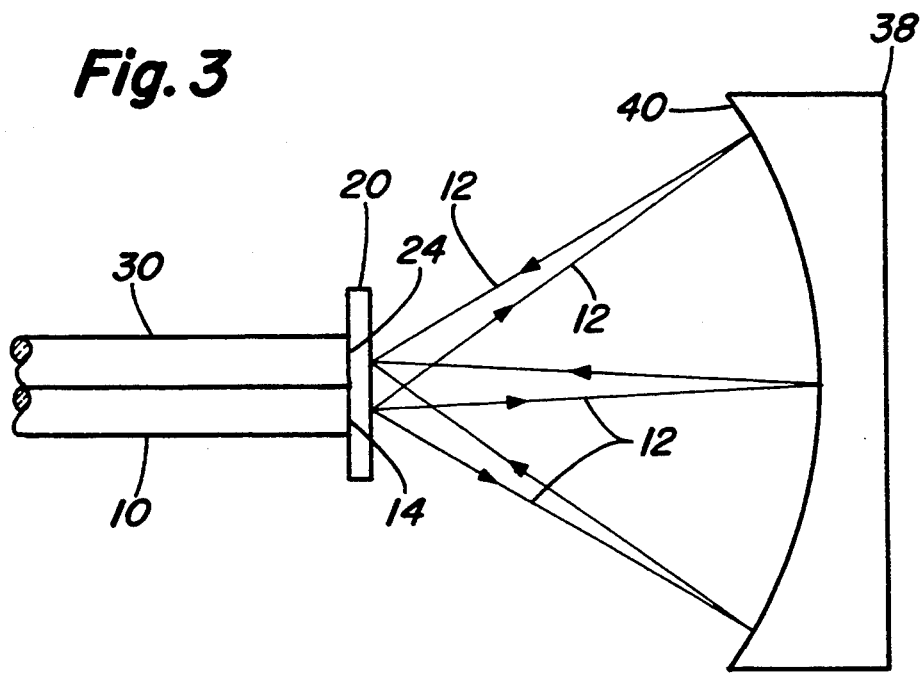
FIG. 3 is an elevational view of a modified form of the invention using reflected light principles.

With reference to FIG. 1, a prior art arrangement of a light valve used in a fiber optic system is shown. More specifically, the system comprises a light source (not shown), such as a high efficiency light source, operatively associated with a first light guide or input optical fiber 10. Light is transmitted into an input end of the first light guide and travels therethrough along a light-transmissive core that has a relatively high index of refraction. Light rays 12 exit an output end 14 of the first light guide. A portion of these light rays are collimated, or made parallel, by a first lens 16, the right-hand side of which has a convex surface. The light rays then proceed in generally parallel fashion through a scattering panel 20 toward a second or focusing lens 22. The second lens has a convex surface on the lefthand side and focuses the light rays onto an input end 24 of a second light guide or output optical fiber 30.

More particularly, the scattering panel 20 is preferably a liquid crystal display (LCD) which in the presence of an electrical field, aligns the molecules of the crystals to facilitate transmission of light therethrough. By selectively regulating the electrical field associated with the LCD panel 20, the amount of light transmitted therethrough can be controlled. When the field is applied, the dipole molecules align and allow a greater transmission of light therethrough. On the other hand, in the absence of an electrical field, the light is diffused or scattered, resulting in transmission of only a small portion of the light.

In the prior art arrangement of FIG. 1, the light rays 12 are collected and focused by the second lens 22. The focus of the second lens is located at the input end 24 of the second light guide or output fiber 30. This arrangement provides an in-line light valve or switching assembly to control passage of light from a source to an end use.

Although having a wide range of commercial application, the arrangement of FIG. 1 is not without problems. For example, this arrangement is subject to a high degree of loss due to scattering, absorption, and distortion. Still further, the contrast ratio between the on/off states is not as high as desired.

With continued reference to FIG. 1, and additional reference to FIG. 2, substantially the same reference numerals are used to illustrate a first modification to the known arrangement. Light is received through the input fiber 10 and emitted at its output end 14. The light rays are collimated by the first lens 16 in the same manner as described above and, again, regulation of light transmission is provided by LCD panel 20. According to this arrangement, though, the distance between the collecting portion of the optics system, i.e., lens 22 and output fiber 30, and the scattering panel is substantially increased. As represented by a series of arrows 32 in FIGS. 1 and 2, in the absence of an electrical field, the light is diffused or scattered by the panel 20. The diffused light is randomly directed but, as will be understood, if the collecting lens 22 is positioned closely adjacent the panel 20, as is the typical case, a portion of the diffused light still enters the second lens and is transmitted to the output fiber 30.

In the arrangement of FIG. 2, though, the second lens 22 is spaced a predetermined dimension "d" on the order of five times the diameter of the lens, or more, which limits the amount of scattered light collected by lens 22. Thus, the contrast ratio between the on and off states is much higher since when light is scattered, there is less of a chance of the scattered light reaching output fiber 30 under the arrangement of FIG. 2 as opposed to that shown in FIG. 1.

Still another problem associated with the arrangement of FIG. 1 is the light loss resulting from absorption and distortion. As will be understood by one skilled in the art, there are particular applications where it is extremely important to minimize such losses.

As shown in FIG. 3, a modified in-line switching arrangement includes a reflecting surface such as concave mirror 38 to address these types of losses. The mirror has a generally spherical surface 40 that is highly reflective and, accordingly, has virtually no scattering loss, and absorption/distortion losses of only a few percent. Preferably, the mirror has a radius of curvature many times greater than the diameter of the light guide. For example, a magnitude on the scale of ten times greater effectively minimizes distortion and, consequently, losses. Additionally, the diameter of the mirror is chosen to match the acceptance angle of the light guide and minimize the loss of light.

The input fiber 10 conveys light from the source (not shown) to its output end 14 as represented by light rays 12. The light rays are generally directed toward the spherical surface 40, which can be of any well known construction, but is intended to be highly reflective. The highly reflective surface maximizes the amount of light reflected and focused on input end 24 of the output fiber 30. Thus, as shown, the input and output fibers face in substantially the same direction. That is, the output and input ends 14, 24 of the fibers 10, 30, respectively, face in the same direction toward the spherical surface 40.

Preferably, the scattering panel 20 is affixed to both the input and output fiber ends so that the light rays 12 pass through the scattering panel twice. The light rays exit the input fiber 10, pass through the scattering panel 20, reflect off surface 40, and are redirected through the scattering LCD panel into the output fiber 30. Thus, a corresponding increase in the ratio between the on/off states is achieved by multiple passes through the scattering panel. Simultaneously, the FIG. 3 arrangement is extremely compact and overcomes losses associated with the prior art arrangement of FIG. 1.

To further reduce losses associated with the interface between the scattering panel 20 and the fibers 10, 30, an index matching gel or liquid can be used between the fiber ends and the scattering panel. The index matching material assures a more effective transfer of light between the light-transmissive core of the optical fibers. It will also be recognized that the ends of the input and output fibers need not be disposed on a common plane abutting against the scattering panel as shown in FIG. 3. Although positioning of the fiber ends in a common plane is preferred for simplicity, symmetry, and the like, the teachings of the subject invention are equally applicable to other arrangements.

Figure 4:
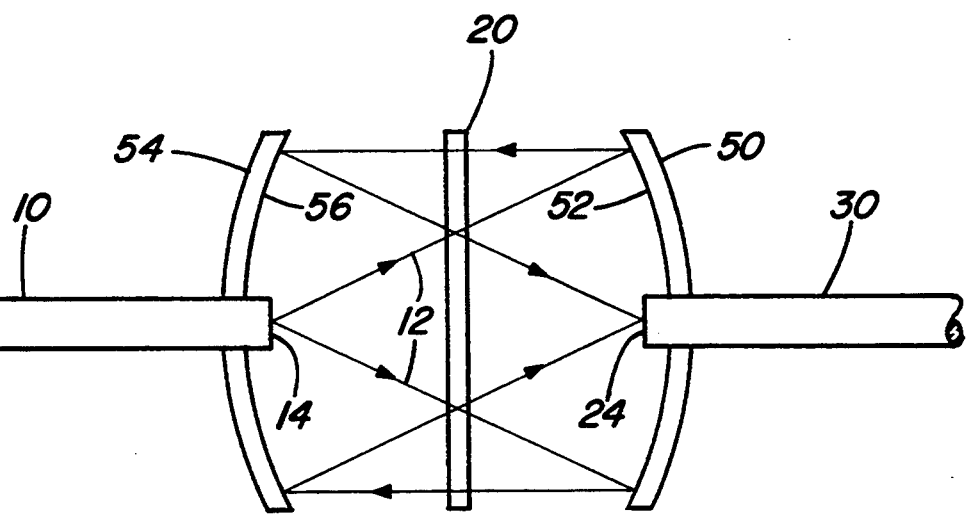
FIG. 4 is an elevational view of another modified form of the invention.

Still another modification is shown in FIG. 4. There, the light rays 12 exit the input fiber and are collimated by a first mirror 50 having a highly reflective spherical surface 52. The parallel light rays are directed toward a second mirror 54 which also has a highly reflective spherical surface 56. The light rays are reflected by the second mirror and focused on the input end 24 of the output fiber° As the light rays proceed from the input fiber to the output fiber, they ideally pass through the scattering panel 20 three times. Again, this desirably increases the contrast ratio of light transmission between the on and off states effected by selective application of the electric field.

As will be appreciated from a review of FIG. 4, the output end 14 of the input fiber is located at the focus of the first mirror 50. In a similar manner, the input end 24 of fiber 30 is ideally positioned at the focus of the second mirror 54. Thus, the foci of the cooperating pair of mirrors are located on-line or on the same axis as the input and output fibers. Although this necessarily requires openings to be formed in each of the mirrors to accommodate the input and output fibers, it does provide for an extremely compact and symmetrical optical arrangement. Still further, although the surfaces 52, 56 are illustrated as generally spherical, still other reflecting surfaces that achieve the same function, such as parabolic or elliptical surfaces, can be used with equal success. Moreover, by centrally locating the scattering panel 20 between the mirrors, and having the panel extend to the outer edges of the mirror, it is assured that all of the light transmitted through the scattering panel in its transparent first state will pass through the scattering panel three times.

Figure 5:
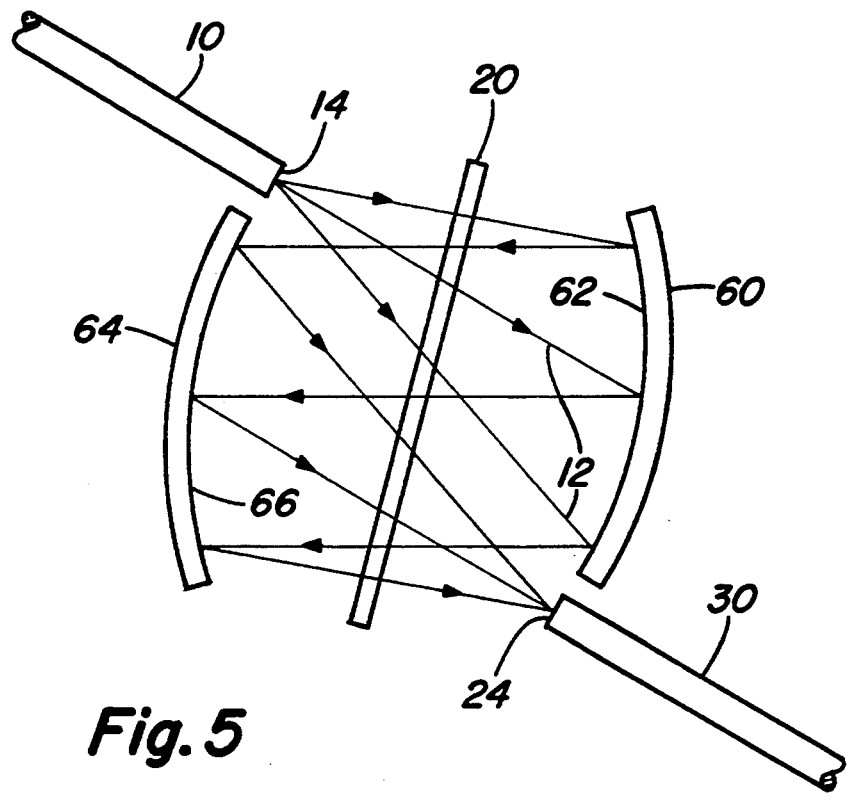
FIG. 5 is an elevational view of still another modified form of the invention.

A related arrangement is shown in FIG. 5 that achieves the same desired result of regulating light transmission between input and output fibers with a high contrast ratio between the on and off states. More particularly, in FIG. 5 the fiber optic system includes a pair of reflecting mirrors and a scattering panel interposed therebetween. The input light guide 10, though, is not coaxial with the output light guide 30. Instead, the end 14 of the input light guide is disposed at the focus of a first parabolic mirror 60 having a highly reflective surface 62. The reflective surface 62 collimates the light rays 12 and directs them toward a second parabolic mirror 64. That mirror also has a highly reflective surface 66 that receives the collimated light rays and focuses them on the input end of the output light guide 30. The scattering panel 20 is positioned between the mirrors and is dimensioned to assure that the light rays reflected by the mirrors pass through it three times.

Many of the advantages of the FIG. 4 assembly are maintained with this off-axis parabolic mirror arrangement in FIG. 5. One distinct additional advantage is the ability to eliminate the openings in the pair of mirrors to accommodate the input and output light guides. In the off-axis arrangement, the ends of the respective optical fibers are still located at the focus of the respective first and second mirrors, but the slightly canted or angular disposition of the mirrors permits the light rays to enter the assembly from an area adjacent the edges of the mirrors.

Figure 6A:
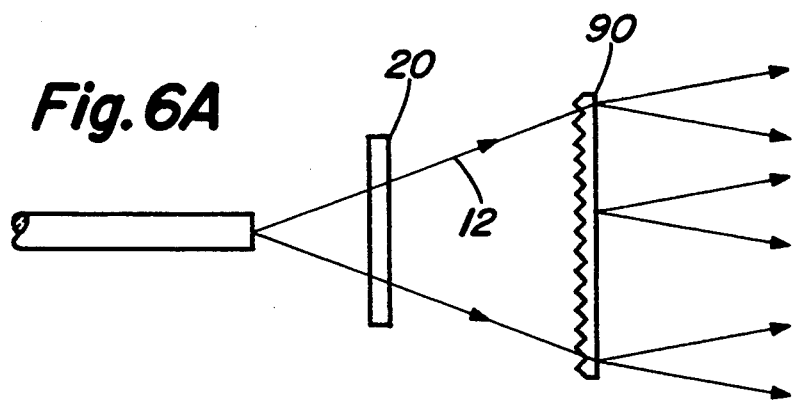
FIG. 6A is an elevational view of a scattering panel interposed between the end of a light guide and lens in a transmissive, first state; and, FIG. 6B is an elevational view substantially identical to FIG. 6A but illustrating the diffusing, second state.
Figure 6B:
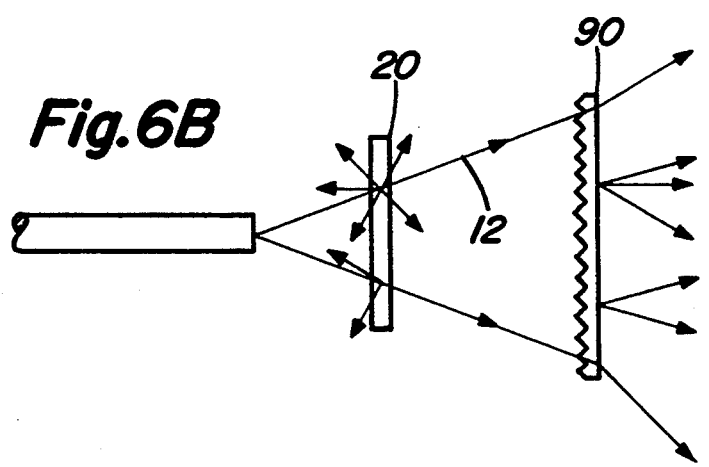

FIGS. 6A and 6B illustrate transparent and diffuse states of a scattering panel 20 disposed adjacent the end of a light guide 10. On the opposite side of the scattering panel from the light guide is located the lens of, for example, a park/stop light. Two distinct levels of light intensity are required for the park/stop light. A lower amount of light is required when it serves as a park light while application of the brakes demands a greater amount of light to alert trailing automobiles.

As shown in FIG. 6A, the transparent state of the scattering panel transmits a large portion of the light rays therethrough and directs them toward the lens 70. In FIG. 6B, on the other hand, the electric field is removed from the scattering panel, thus placing it in a diffused state whereby the light is reflected by the crystals. A lower amount of light thus proceeds to the lens 70 to represent the park light function. For example, if a vehicle operator then steps on the brake, an electrical signal is provided which transforms the scattering panel to the transparent state shown in FIG. 6A and transmits a greater amount of light to the lens. This brightens or intensifies the light as desired without resorting to switching a light source on and off.

Of course, it will be recognized that the above described embodiments will be useful in other environments and that modifications can be made thereto. For example, other curvilinear reflective surfaces can be used in addition to the spherical, elliptical and parabolic arrangements. Likewise, other scattering panels may be substituted for the LCD panel. It is also recognized that the scattering panel need not be limited to arrangements representing only on and off states of a light source but will find utility in applications where varying the amount of the light can be used for dimming purposes.

While the invention has been described in terms of preferred embodiments, those skilled in the art will recognize that the invention can be practiced with modification within the spirit and scope of the appended claims.

What we claim as new and desire to secure by Letters Patent of the United States is:

1. A compact, in-line valving apparatus for a light guide for regulating the amount of light transmitted therethrough, the apparatus comprising:
   a first light guide capable of transmitting light from an associated source and having an output end from which the light exits;
   a second light guide disposed parallel to said first light guide and having an input end located to receive the light from the first light guide;
   a liquid crystal scattering panel disposed perpendicular to the longitudinal axis of at least one of said first and second light guides and in the path of light exiting the first light guide and entering the second light guide, the panel being responsive to an electrical field applied thereto for transmitting or diffusing the light as desired; and
   a reflecting surface disposed in the path of the light for focusing the light on the input end of the second light guide.

2. The apparatus as defined in claim 1 wherein the output and input ends of the first and second light guides, respectively, face in substantially the same direction toward the reflecting surface and the scattering panel extends over at least one of the input and output ends.

* * * * *